(12) United States Patent
Kita et al.

(10) Patent No.: US 8,583,357 B2
(45) Date of Patent: Nov. 12, 2013

(54) TARGET IDENTIFICATION DEVICE AND TARGET MOVEMENT PREDICTION METHOD

(75) Inventors: Hitoshi Kita, Osaka (JP); Yukihiro Tokuyama, Osaka (JP)

(73) Assignee: Icom Incorporated, Osaka (JP)

( * ) Notice: Subject to any disclaimer, the term of this patent is extended or adjusted under 35 U.S.C. 154(b) by 128 days.

(21) Appl. No.: 13/111,003

(22) Filed: May 19, 2011

(65) Prior Publication Data

US 2012/0191335 A1   Jul. 26, 2012

(30) Foreign Application Priority Data

Jan. 21, 2011   (JP) ................................. 2011-011127

(51) Int. Cl.
  *G05D 1/02*   (2006.01)
  *G08G 5/04*   (2006.01)

(52) U.S. Cl.
  CPC ... *G05D 1/02* (2013.01); *G08G 5/04* (2013.01)
  USPC ........... 701/300; 701/301; 701/302; 340/961; 342/41

(58) Field of Classification Search
  USPC .................. 701/300–302; 340/903, 960–964; 342/41
  See application file for complete search history.

(56) References Cited

U.S. PATENT DOCUMENTS

| 6,201,482 | B1* | 3/2001 | Schiefele et al. | 340/961 |
|---|---|---|---|---|
| 6,862,527 | B2* | 3/2005 | Okamura et al. | 701/301 |
| 7,830,275 | B2* | 11/2010 | Hiraoka | 340/984 |
| 8,180,507 | B2* | 5/2012 | Dokken | 701/21 |
| 2006/0031007 | A1* | 2/2006 | Agnew et al. | 701/204 |
| 2006/0290562 | A1* | 12/2006 | Ehresman | 342/41 |
| 2007/0244635 | A1* | 10/2007 | Asahara et al. | 701/207 |
| 2011/0128162 | A1* | 6/2011 | Klepsvik | 340/985 |
| 2011/0144912 | A1* | 6/2011 | Lee et al. | 701/301 |
| 2012/0130571 | A1* | 5/2012 | Dunkle | 701/21 |

FOREIGN PATENT DOCUMENTS

| JP | 2005-300388 A | 10/2005 |
|---|---|---|
| JP | 2006-065392 A | 3/2006 |

* cited by examiner

*Primary Examiner* — Thomas Tarcza
*Assistant Examiner* — Tyler J Lee
(74) *Attorney, Agent, or Firm* — Muncy, Geissler, Olds & Lowe, PLLC

(57) ABSTRACT

A target identification device in a user object includes: a user information obtaining part and a target information obtaining part obtaining a position, a speed over ground and a course over ground of the user object and a target object; a processor that calculates a CPA distance and a TCPA with respect to the target object relative and the user object, based on the positions, the speeds over ground and the courses over ground of the user object and the target object. The processor replaces the course over ground of the user object with a direction toward the target object and calculates the CPA and the TCPA when the speed over ground of the user object is a low speed determination value or less.

18 Claims, 5 Drawing Sheets

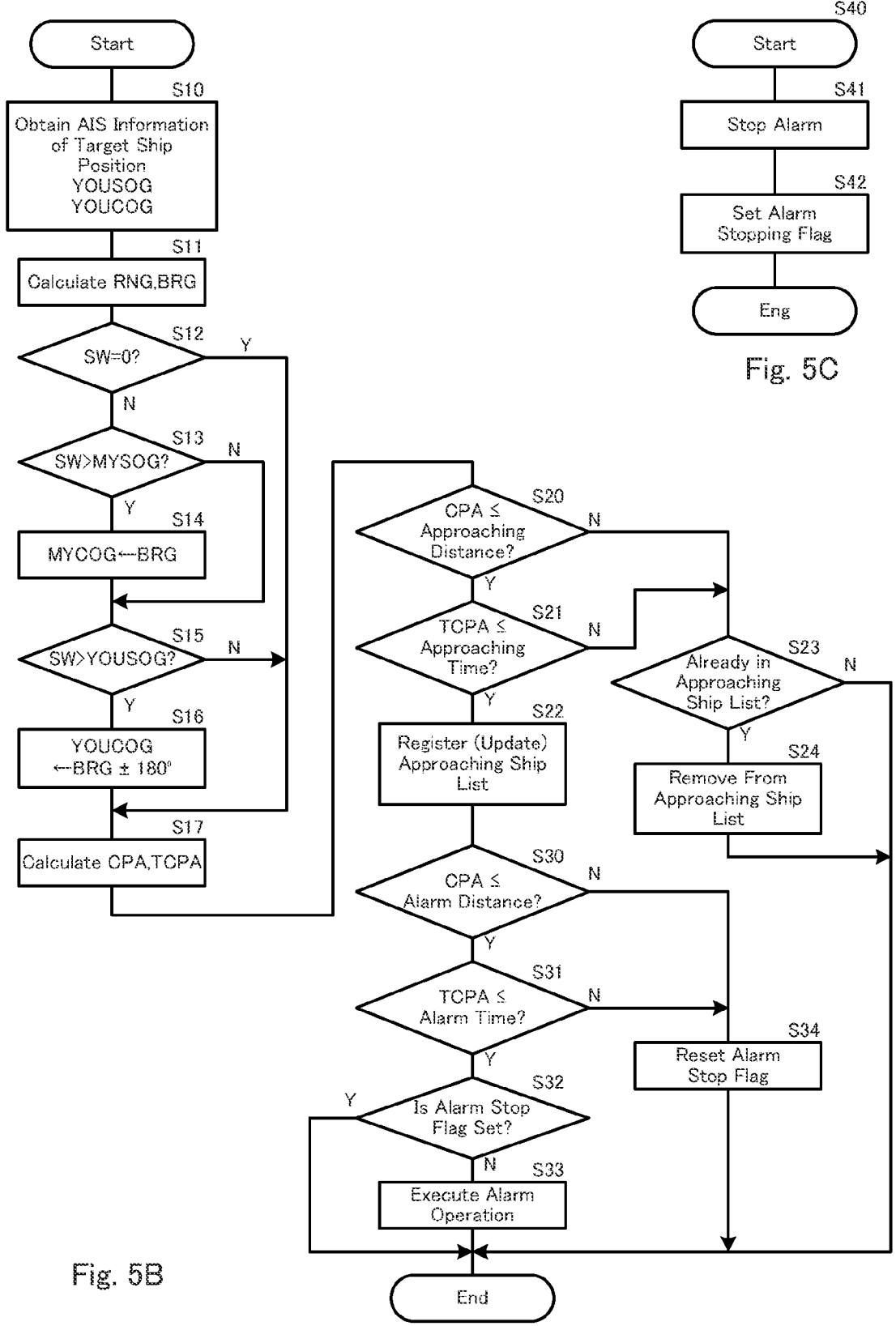

TARGET IDENTIFICATION DEVICE AND TARGET MOVEMENT PREDICTION METHOD

CROSS REFERENCE TO RELATED APPLICATION

The present invention is related to, claims priority from, and incorporates by reference Japanese Patent Application No. 2011-011127, filed on Jan. 21, 2011.

TECHNICAL FIELD

This invention relates to a target identification device and a target movement prediction method for calculating a closest point of approach (CPA) and a time to the closest point of approach (TCPA) between a user device and a target device.

BACKGROUND

For preventing collisions between ships and for improving marine traffic control by accurate information of movement of the ships, an automatic identification system (AIS) device has been utilized. The AIS transponder has a function to measure a position, a speed over ground (SOG) and a course over ground (COG) of a ship using a global positioning system (GPS) device. The AIS transponder also has a function to receive AIS information of other ships including identification information (maritime mobile service identity (MMSI) code), ship name, position, SOG, COG, destination and the like, which are received from the other ships using VHF band radios.

For an AIS transponder for a small ship, the SOG and COG of the ship are calculated from difference vectors obtained from a history of GPS positioning results (see Japanese Laid-Open Patent Application No. 2006-65392).

In addition, based on the obtained information of the user ship (ship that is used as a point of origin for calculation) and another ship (target ship), CPA, which is the distance at which the target ship approaches the closest to the user ship, and TCPA, which is the time for the target ship to approach the closest to the user ship, are calculated. When CPA and TCPA are below predetermined values, an alarm is generated to warn the user.

Positioning by GPS includes positioning errors of a few meters to more than ten meters. When the ship is moving faster than a certain speed, effects of the positioning errors are small because a long difference vector is obtained. However, when the ship is stopping or moving at low speed, effects of the positioning errors become significant because the difference vector obtained is short. Therefore, the SOG and COG of the ship vary randomly. For example, when the ship is stopping, the COG varies randomly between 0° and 359.9° in all directions, and the SOG varies randomly between 0 and 3 kt depending on locations of GPS satellites or depending on selections of the GPS satellites that a GPS engine uses for calculation.

As a result, close approaches or collisions cannot be always accurately informed to the user due to the low reliability of the CPA and TCPA when the ship is stopping or moving at low speed. In addition, the CPA and TCPA may randomly vary across a threshold value for the alarm up and down. In such a case, an alarm may be repeatedly executed and stopped and an alarm that was previously executed and stopped may be executed again.

An object of the present invention is to provide a target identification device and a target movement prediction method in which the CPA and TCPA do not randomly vary when a moving object, such as a ship, is stopping or moving at low speed.

SUMMARY

A target identification device disclosed in the application, which is installed in a user object includes a user information obtaining part that obtains a position, a speed over ground and a course over ground of the user object; a target information obtaining part that obtains a position, a speed over ground and a course over ground of a target object; a processor in communication with the user information obtaining part and the target information obtaining part and that calculates a closest point of approach, and a time to the closest point of approach with respect to the target object and the user object, based on the position, the speed over ground and the course over ground of the user object and the position, the speed over ground and the course over ground of the target object. The processor replaces the course over ground of the user object with a direction oriented toward the target object and calculates the closest point of approach and the time to the closest point of approach when the speed over ground of the user object is equal to or less than a first low speed determination value.

In a preferred embodiment, the user information obtaining part calculates the speed over ground and the course over ground of the user object based on the position of the user object measured by a global positioning system.

In another preferred embodiment, the processor replaces the course over ground of the target object with a direction oriented toward the user object and calculates the closest point of approach and the time to the closest point of approach when the speed over ground of the target object is equal to or less than a second low speed determination value.

In another preferred embodiment, the target identification device includes a warning part that executes a warning operation when at least one of the calculated closest point of approach and the time to the closest point of approach satisfies a predetermined warning condition.

In another aspect of the disclosure, a target movement prediction method for predicting a movement of a target object that is another object from a user object includes: a step for obtaining a position, a speed over ground and a course over ground of the user object; a step for obtaining a position, a speed over ground and a course over ground of the target object; a step for comparing the speed over ground of the user object with a first low speed determination value; a step for calculating a closest point of approach and a time to the closest point of approach with respect to the target object and the user object, based on the position, the speed over ground and the course over ground of the user object and the position, the speed over ground and the course over ground of the target object, when the speed over ground of the user object is greater than the first low speed determination value; and a step for replacing the course over ground of the user object with a direction oriented toward the target object and calculating the closest point of approach and the time to the closest point of approach when the speed over ground of the user object is equal to or less than the first low speed determination value.

In a preferred embodiment, the target movement prediction method includes: a step for replacing the course over ground of the target object with a direction oriented toward the user object and calculating the closest point of approach and the time to the closest point of approach when the speed over ground of the target object is equal to or less than a second low speed determination value.

According to the present invention, approaching of a target can be determined with high reliability even when the moving object, such as a ship, a boat, a watercraft or an off road motorcycle, is stopping or moving at low speed.

BRIEF DESCRIPTION OF THE DRAWINGS

FIGS. 5A-5C are flow diagrams illustrating operations performed when a digital selective calling (DSC) key on the AIS transponder is turned on.

DETAILED DESCRIPTION OF THE EMBODIMENT

A device of Automatic Identification System (AIS transponder) according to the embodiment of the present invention is explained with reference to the drawings.

The AIS transponder 1 transmits AIS information of a ship on which the AIS transponder is installed (hereinafter referred to as "user ship"), and receives and displays AIS information of other ships (hereinafter referred to as "target ship(s)"). The AIS information is formed from data, such as ship name, MMSI code, current position, SOG, COG, destination, loaded objects and the like. In addition, the AIS transponder 1 warns the user by executing alarm operation of an alarm sound and/or an alarm display when a target ship is approaching very closely to the user ship. In the embodiment, the display part 12, alarm sound generator 14, memory 11 and CPU 10 configures a warning part.

Figure 1:
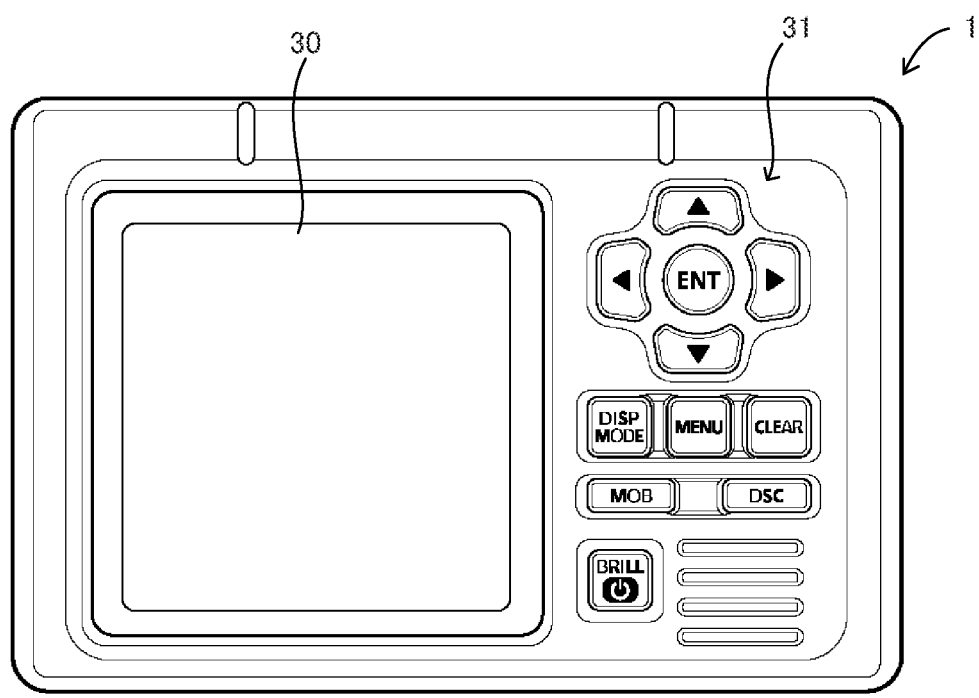
FIG. 1 is an external view of a front panel of an AIS transponder according to an embodiment of the present invention.

In FIG. 1, a display 30 and a key switch group 31 are provided on the front panel of the AIS transponder 1. The display 30 is an approximately square liquid crystal display (LCD) and is provided on the left part and the center of the front panel. The AIS information of target ships received by a radio receiver 16 is displayed on the display 30 in various display forms. The key switch group 31 is provided on the right part of the front panel and includes an enter (ENT) key, up and down keys, left and right keys, a display mode (DISP MODE) key, a menu (MENU) key, and the like. The user operates the key switch group 31 to configure a low speed determination speed that is discussed later, an alarm distance and alarm time, to stop the alarm, and the like.

Figure 2:
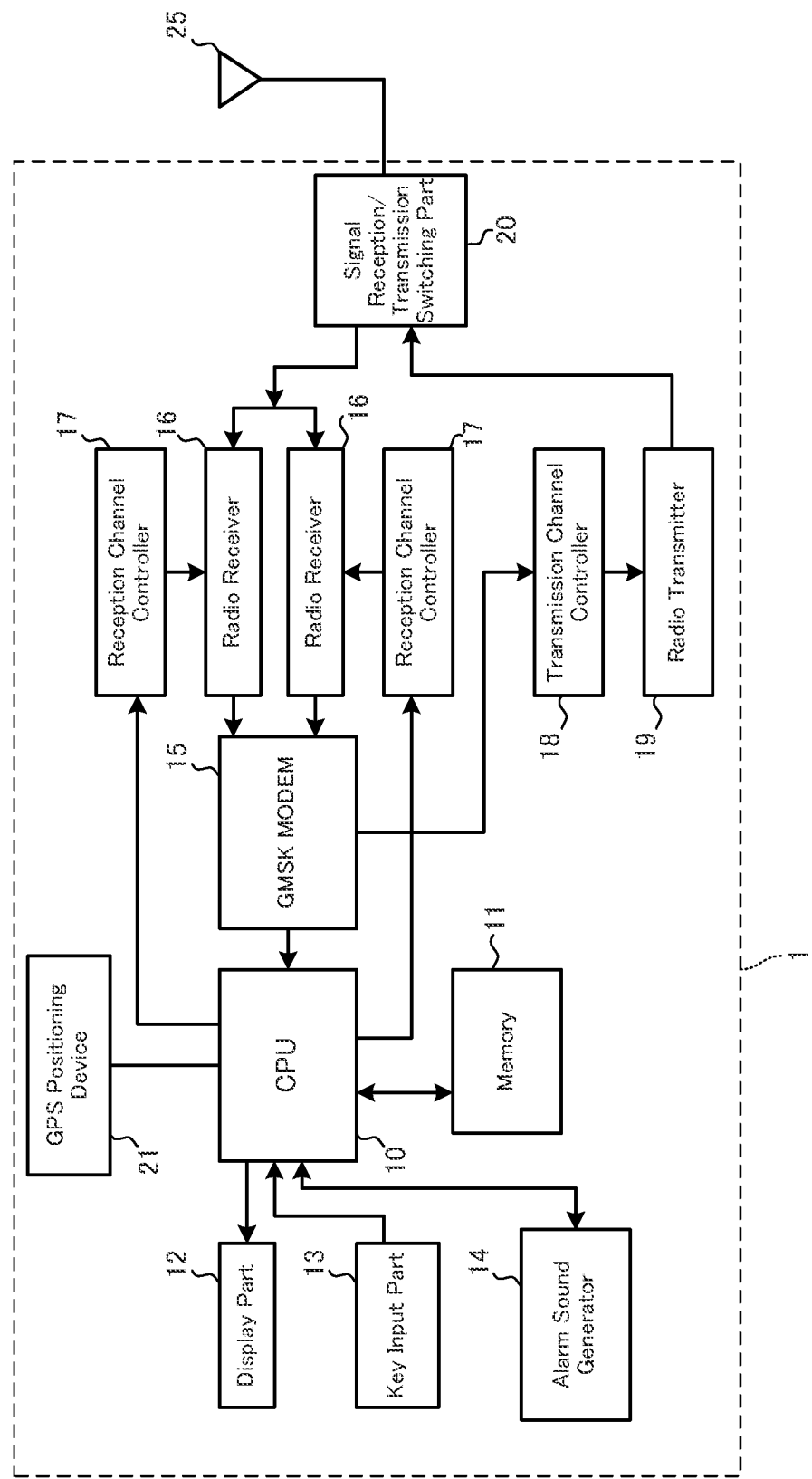
FIG. 2 is a block diagram illustrating an internal structure of the AIS transponder.

In FIG. 2, the AIS transponder 1 includes a central processing unit (CPU) 10, a memory 11, a display part 12, a key input part 13, an alarm sound generator 14, a Gaussian filtered minimum shift keying modulator/demodulator (GMSK modem) 15, the radio receivers 16, a reception channel controller 17, a transmission channel controller 18, a radio transmitter 19, a signal transmission/reception switching part 20, and a GPS device 21. An antenna 25 is connected to the signal transmission/reception switching part 20.

The GMSK modem 15 modulates the AIS information of the user ship using GMSK, which is a type of continuous phase frequency shift keying (CPFSK), and demodulates and inputs to the CPU 10 the AIS information (modulated using GMSK) of target ships input from the radio receiver 16. The radio receiver 16 inputs the received signal to the GMSK modem 15. The reception channel controller 17 sequentially switches the reception channels. As a result, the radio receiver 16 is able to receive the AIS information of the target ships transmitted in each channel. Two systems of the radio receiver 16 and the reception channel controller 17 are provided in parallel and scan the AIS channels concurrently to receive the AIS information of target ships.

The transmission channel controller 18 sets a transmission channel to transmit the AIS information of the user ship. A free channel is searched by the traffic of each channel received by the radio receiver 16 and may be used as the transmission channel. The radio transmitter 19 transmits the GMSK-modulated AIS information of the user ship by shifting the frequency for the signal transmission to a frequency band of the transmission channel set by the transmission channel controller 18. The signal transmission/reception switching part 20 switches the antenna 25 to the radio transmitter 19 side at the time of transmission and to the radio receiver 16 side at the time of receipt.

The key input part 13 includes the key switch group 31, and detects and inputs the user's key operation to the CPU 10. The alarm sound generator 14 generates an alarm sound in response to an instruction from the CPU 10.

The CPU 10 controls the operation of the entire AIS transponder 1. The GPS device 21 determines the position of the user ship based on signals from the GPS satellites received by a GPS antenna (not shown). The CPU 10 receives the positioning results including the position of the user ship, SOG and COG of the user ship from the GPS device 21. The CPU 10 executes processes including calculations of a range (RNG) and a bearing (BRG) of the target ships, the CPA and the TCPA based on the information of the user ship and the information of the target ships received by the radio receiver 16. The processes executed by the CPU 10 are explained in detail in the flow diagram shown in FIG. 5.

The memory 11 stores the AIS information of the user ship and target ships, and the above-described calculation results. The AIS information of target ships is registered in a list ("target list"). In addition, of those target ships, ships that are approaching closely to the user ship are also registered in an approaching ship list ("danger list"). These pieces of information are displayed on the display 30 as shown in FIG. 3 in response to the user operation. The display part 12 includes the display 30 and displays the information input from the CPU 10 on the display 30.

Figures 3A, 3B, 3C:
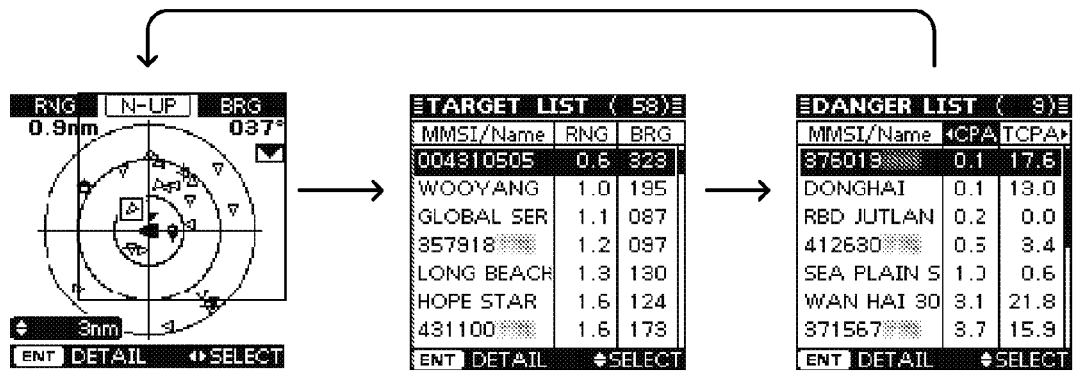
FIGS. 3A-3C illustrate various screens displayed on a display of the AIS transponder.

FIG. 3A illustrates a display example in plotter format. FIG. 3B illustrates a display example in list ("target list") format. In this format, the information of target ships, from which the current AIS information is received, is displayed in the list. In this target list, the MMSI code or ship name, the range (RNG) from the user ship, the bearing (BRG) from the user ship of each target ships are displayed. The AIS information may be displayed line by line in order of the ships closest to the user ship.

FIG. 3C illustrates a display example in approaching ship list ("danger list") format. The approaching ship list is a list of approaching ships that have a chance to approach closely to the user ship within a certain amount of time extracted from the target ships from which the AIS information is received. For example, ships that may be 6 nautical miles or less from the user ship (CPA≤6 nautical mile [nm]) within one hour (TCPA≤1 hour) are extracted and displayed as approaching ships.

An alarm operation is executed when there is a target ship among the approaching ships, which may possibly approach within a short distance (range) of the user ship within a short amount of time and has a risk of collision (dangerous ship).

1.5 nm and 20 minutes are set as default of an alarm distance and an alarm time respectively which are a threshold CPA value and a threshold TCPA value for executing the alarm operation. However, the user may configure these values between 0.1 and 6 nm and between 1 and 60 minutes, respectively.

User can configure these threshold values by operating the key switch group 31. For example, the alarm distance and the alarm time may be configured 1.5 nm and 20 minutes respectively. In this example, if there is a target ship which is calculated to come within 1.5 nm from the user ship within 20 minutes, the alarm operation is executed.

The alarm operation may be stopped by user operation. An alarm stopping flag indicating that the alarm has been stopped may be provided for each of the ships registered in the approaching ship list. Alternatively, a single flag may be provided for all approaching ships.

A method for calculating the CPA and the TCPA and a low speed mode (Slow Warn) process for the AIS transponder 1 of the present embodiment are explained with reference to FIGS. 4A-4C.

Figures 4A, 4B:
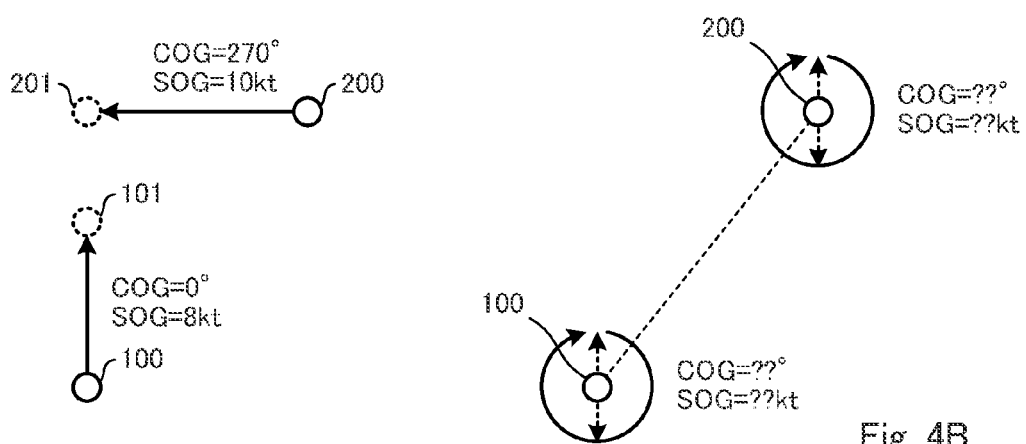
FIGS. 4A-4C are diagrams for explaining a method for calculating the CPA and TCPA by the AIS transponder.
Figure 4C:
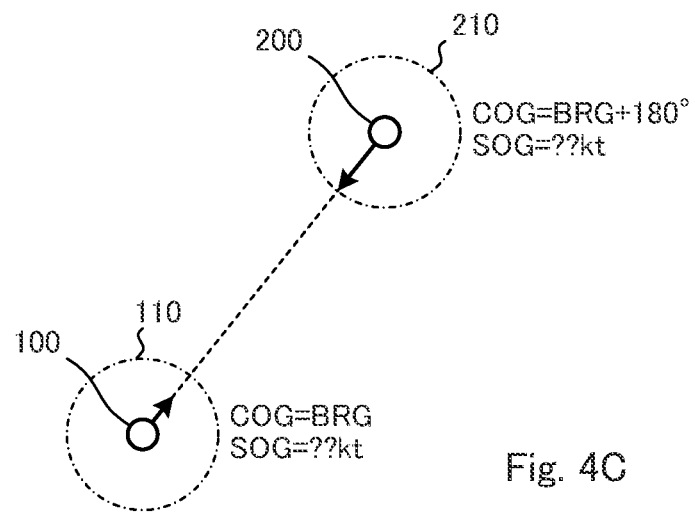

FIG. 4A illustrates a situation where a user ship 100 and a target ship 200 are moving under normal conditions. In the figure, the user ship 100 is moving at the angle of 0° (COG=0°) and at the speed of 8 kt (knot) (SOG=8 kt). In addition, the target ship 200 is moving at the angle of 270° (COG=270°) and at the speed of 10 kt (SOG=10 kt). In this situation, the CPA is a distance between a predicted position 101 where the user ship is approaching and a predicted position 201 where the target ship 200 is approaching, and the TCPA is the time for which the user ship 100 reaches the predicted position 101 as well as the target ship 200 reaches the predicted position 201. When the ships are moving at a speed faster than a certain speed, the values of the COG and SOG that are calculated based on the positioning results are stable with small errors, because the GPS positioning errors are enough small compared to the moving distance of the ships. The SOG and COG are a length and a direction of a difference vector determined by the current and previous positioning results. The CPA and TCPA are calculated based on the above calculated COG and SOG and the positions of the user ship and the target ship. When the above calculated CPA and TCPA satisfy the condition for the alarm, that is, when the CPA is equal to or less than the alarm distance and when the TCPA is within the alarm time, the AIS transponder 1 executes the alarm operation.

The COG and SOG of the target ship are calculated by the AIS transponder on the target ship. However, the relationship between the moving speed and the GPS positioning errors is the same.

FIG. 4B illustrates a situation where the user ship 100 and the target ship 200 are stopping or moving at low speed. When a ship is stopping or moving at low speed, the positioning results are unstable, even though the ship remains substantially at the same position because of a few meters to tens of meters of the GPS positioning errors. Therefore, the COG and SOG, which are calculated from the difference vectors determined by the current and previous positioning results that include the random error as above, vary randomly. The COG varies randomly in a range of 0°-359.9°, and the SOG varies randomly in a range of 0-3 kt. As a result, the CPA and TPCA, which are calculated from the COG, SOG and the positions of the user ship and the target ship, also vary randomly. Therefore, the approach prediction based on the above CPA and TCPA is not reliable. Furthermore, because the calculated CPA and TCPA may fluctuate across their threshold values, even if the alarm is stopped, the alarm operation may be executed again.

In the AIS transponder 1 of the present invention, the low speed mode is used. FIG. 4C is a diagram explaining a method for calculating the CPA and TCPA under the low speed mode. When one or both of the user ship and the target ship are stopping or moving at low speed as discussed above, that is, when the calculated SOG for a ship is less than a low speed determination speed SW, the direction toward the target ship is set as the COG for that ship. That is, when the SOG of the user ship is less than the low speed determination speed SW (or first low speed determination value), the CPA and TCPA are calculated with setting a BRG to the COG of the user ship. Namely, the COG of the user ship is oriented in the direction toward the target ship. On the other hand, when the SOG of the target ship is less than the low speed determination speed SW (or second low speed determination value), the CPA and TCPA are calculated with setting BRG±180° to the COG of the target ship. Namely, the COG of the target ship is orientated in the direction toward the user ship.

As discussed above, where a ship is stopping or moving at low speed, resulting in the large positioning errors, a prediction of approaching/dangerous ships is reliably achieved by setting the COG of the ship in the direction toward the target ship and by calculating the CPA and TCPA for that ship.

In addition, as a result of such setting, because the CPA and TPCA do not fluctuate across the threshold values for the alarm distance and the alarm time, the drawback that the alarm operations are repeatedly executed and stopped is resolved.

For the low speed determination speed SW, 1 kt is set as a default value for the embodiment. However, this value may be changed in a range of 0.1-4.9 kt by user operation. Moreover, by setting the low speed determination speed SW to OFF (=0), the low speed mode can be canceled. Furthermore, a separate operation step or switch may be provided for turning on and off the low speed mode.

In this embodiment, the first and second low speed determination values are identical. However, the values might be different each other.

Figure 5A:
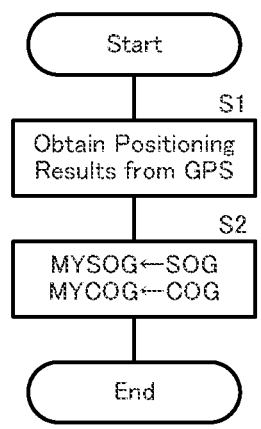

FIG. 5A is a flow diagram illustrating a user ship information obtaining operation. FIG. 5B is a flow diagram illustrating a target ship processing operation. FIG. 5C is a flow diagram illustrating an alarm stopping operation. The user ship information obtaining operation shown in FIG. 5A and the target ship processing operation shown in FIG. 5B may be executed at regular time intervals (e.g., 5 seconds). The alarm stopping operation shown in FIG. 5C may be executed in response to an alarm stopping operation by the user. Moreover, the target ship processing operation shown in FIG. 5 may be repeatedly executed for each set of information of the target ships received by the radio receiver 16.

In FIG. 5A, first, positioning results including the position of the user ship, the SOG and the COG are obtained from the GPS device 21 (S1). Then, the SOG is input to MYSOG indicating the SOG of the user ship, and the COG is input to MYCOG indicating the COG of the user ship (S2).

In FIG. 5B, first, the position, the SOG (YOUSOG indicating the SOG of the target ship) and the COG (YOUCOG indicating the COG of the target ship) of the target ship are obtained (S10). Then, the range RNG from the target ship and the bearing BRG to the target ship are calculated from the positions of the target ship and the user ship (S11).

Next, it is determined as to whether or not the low speed determination speed SW for the low speed mode is zero (S12). If the low speed determination speed SW is zero (No at S12), the process skips S13-S16 and jumps to S17 because it means that the low speed mode has been canceled. If the low speed determination speed SW is greater than zero (Yes at S12), the process proceeds to at S13 and processes thereafter are executed because it means that the low speed mode has been set.

At S13, it is determined as to whether the MYSOG, which is the SOG of the user ship, is less than the low speed determination speed SW. If the MYSOG is less than the low speed determination speed SW (Yes at S13), the BRG which is the bearing towards the target ship, is set for the MYCOG, which is the COG of the user ship (S14). Next, it is determined as to whether the YOUSOG, which is the SOG of the target ship, is less than the low speed determination speed SW (S15). If the YOUSOG is less than the low speed determination speed SW (Yes at S15), the BRG of the user ship is set to YOUCOG, which is the COG of the target ship (S16). Because the direction from the target ship to the user ship is in the opposite direction from the BRG, 180° is added to, or subtracted from, the BRG so that the value YOUCOG falls in the range of 0°-359.9°

At S17, the CPA and the TCPA are calculated from the position, MYSOG and MYCOG of the user ship, and the position, YOUSOG and YOUCOG of the target ship. In this step, if the low speed mode has been set and if the MYSOG or the YOUSOG is less than the low speed determination speed SW, the CPA and the TCPA are calculated using BRG as the MYCOG or BRG±180° as the YOUCOG.

Then, it is determined as to whether or not the calculated CPA and TCPA are equal to or less than the approaching distance and approaching time, respectively (S20 and S21). When the CPA is equal to or less than a predetermined approaching distance (e.g., 6 nm) (Yes at S20) and when the TCPA is within predetermined approaching time (e.g., 1 hour) (Yes at S21), information of the target ship is registered in the approaching ship list as an approaching ship that requires a caution (S22). When this target ship has already been registered in the approaching ship list, the information of the target ship is updated. When the CPA is greater than the predetermined approaching distance (No at S20) or when the TCPA is longer than the predetermined approaching time (No at S21), it is determined that the target ship does not require caution, and the process for this target ship ends. In this case, when the information of this target ship has been registered in the approaching ship list (Yes at S23), the process ends after removing the information from the approaching ship list (S24).

When this target ship has been registered in the approaching ship list, the following alarm processes are executed after the process at S22.

First, it is determined as to whether or not the CPA and TCPA satisfy predetermined alarm conditions. That is, it is determined as to whether or not the CPA is equal to or less than a predetermined alarm distance (e.g., 1.5 nm) (S30) and whether or not the TCPA is within predetermined alarm time (e.g., 20 minutes) (S31). When the CPA is equal to or less than the alarm distance (Yes at S30) and when the TCPA is within the alarm time (Yes at S31), the alarm operation is executed (S33). However, when an alarm stopping flag is set (Yes at S32), the process ends without the alarm operation. When the CPA is greater than the predetermined alarm distance (No at S30) and when the TCPA is longer than the predetermined alarm time (No at S31), the alarm stopping flag is reset (S34), and the process ends. As a result, even if the alarm is stopped, the alarm operation is executed again when another target ship newly satisfies the alarm condition.

FIG. 5C is a flow diagram illustrating the alarm stopping operation. This process is executed when the alarm stopping operation is performed by the user (S40). First, the alarm operation is stopped (S41). Then, the alarm stopping flag is set for all ships subject to the alarm (S42), and the process ends.

The above-described embodiment explains the AIS transponder installed on a ship. However, the target identification device according to the present invention is not limited to those installed on ships.

What is claimed is:

1. A target identification device installed in a user object, comprising:
   a user information obtaining part that obtains a position, a speed over ground and a course over ground of the user object;
   a target information obtaining part that obtains a position, a speed over ground and a course over ground of a target object;
   a processor in communication with the user information obtaining part and the target information obtaining part, wherein
   when the speed over ground of the user object is greater than a first low speed determination value, the processor calculates a closest point of approach, and a time to the closest point of approach with respect to the target object and the user object, based on the position, the speed over ground and the course over ground of the user object and the position, the speed over ground and the course over ground of the target object,
   when the speed over ground of the user object is equal to or less than the first low speed determination value, the processor replaces the course over ground of the user object with a direction oriented toward the target object and calculates the closest point of approach and the time to the closest point of approach.

2. The target identification device according to claim 1, wherein
   the user information obtaining part calculates the speed over ground and the course over ground of the user object based on the position of the user object measured by a global positioning system.

3. The target identification device according to claim 1, wherein
   when the speed over ground of the target object is greater than a second low speed determination value, the processor calculates the closest point of approach, and the time the closest point of approach with respect to the target object and the user object, based on the position, the speed over ground and the course over ground of the user object and the position, the speed over ground and the course over ground of the target object,
   when the speed over ground of the target object is equal to or less than the second low speed determination value, the processor replaces the course over ground of the target object with a direction oriented toward the user object and calculates the closest point of approach and the time to the closest point of approach.

4. The target identification device according to claim 1, further comprising
   a warning part that executes a warning operation when at least one of the calculated closest point of approach and the time to the closest point of approach satisfies a predetermined warning condition.

5. A target movement prediction method for predicting a movement of a target object that is another object from a user object using a target identification device with a processor equipped with the user object, comprising:
- a step by the processor for obtaining a position, a speed over ground and a course over ground of the user object;
- a step by the processor for obtaining a position, a speed over ground and a course over ground of the target object;
- a step by the processor for comparing the speed over ground of the user object with a first low speed determination value;
- a step by the processor for calculating a closest point of approach and a time to the closest point of approach with respect to the target object and the user object, based on the position, the speed over ground and the course over ground of the user object and the position, the speed over ground and the course over ground of the target object, when the speed over ground of the user object is greater than the first low speed determination value; and
- a step by the processor for replacing the course over ground of the user object with a direction oriented toward the target object and calculating the closest point of approach and the time to the closest point of approach when the speed over ground of the user object is equal to or less than the first low speed determination value.

6. The target movement prediction method of claim 5, further comprising:
- a step by the processor for replacing the course over ground of the target object with a direction oriented toward the user object and calculating the closest point of approach and the time to the closest point of approach when the speed over ground of the target object is equal to or less than a second low speed determination value.

7. The target identification device according to claim 1, wherein
the user object is a user ship, and
the direction oriented toward the target object is linear from the user ship to the target object.

8. The target movement prediction method of claim 5, wherein
the user object is a user ship, and
the direction oriented toward the target object is linear from the user ship to the target object.

9. The target identification device according to claim 1, wherein
the first low speed determination value is defined as a speed at which a positioning error included in the calculation by the processor is not small enough compared to a moving distance of the user object so that an effect of the positioning error becomes significant.

10. The target identification device according to claim 3, wherein
the second low speed determination value is defined as a speed at which a positioning error included in the calculation by the processor is not small enough compared to a moving distance of the target object so that an effect of the positioning error becomes significant.

11. The target identification device according to claim 9, wherein
the first low speed determination value is not more than 5 kt.

12. The target identification device according to claim 10, wherein
the second low speed determination value is not more than 5 kt.

13. The target movement prediction method according to claim 5, wherein
the first low speed determination value is defined as a speed at which a positioning error included in the calculation by the processor is not small enough compared to a moving distance of the user object so that an effect of the positioning error becomes significant.

14. The target movement prediction method according to claim 13, wherein
the first low speed determination value is not more than 5 kt.

15. The target movement prediction method according to claim 5, wherein
the second low speed determination value is defined as a speed at which a positioning error included in the calculation by the processor is not small enough compared to a moving distance of the target object so that an effect of the positioning error becomes significant.

16. The target identification device according to claim 15, wherein
the second low speed determination value is not more than 5 kt.

17. The target identification device according to claim 1, wherein
the processor replaces the course over ground of the user object when the speed over ground of the user ship is equal to or less than the first low speed determination value, however the processor does not change an actual course toward which the user object is moving at the time.

18. The target movement prediction method according to claim 5, wherein
at the step for replacing the course over ground of the user object when the speed over ground of the user ship is equal to or less than the first low speed determination value, the processor does not change an actual course toward which the user object is moving at the time.

* * * * *